Figure 1:
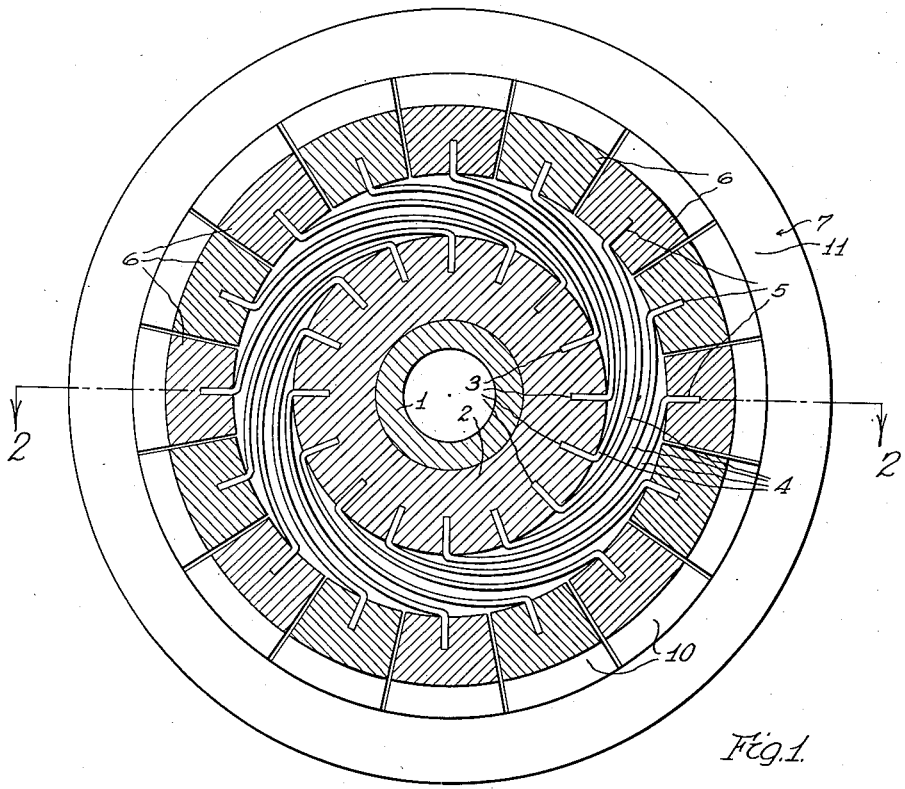

Aug. 4, 1942.    E. H. PIRON    2,291,756
RESILIENT TROLLEY WHEEL
Filed Nov. 29, 1940

INVENTOR.
Emil H. Piron
BY

Patented Aug. 4, 1942

2,291,756

UNITED STATES PATENT OFFICE 2,291,756

RESILIENT TROLLEY WHEEL

Emil H. Piron, New York, N. Y., assignor to Transit Research Corporation, a corporation of New York Application November 29, 1940, Serial No. 367,829

6 Claims. (Cl. 191—63)

This invention relates to trolley wheels for use in conjunction with electrically operated vehicles and has for its primary object to provide a current collector which will function with greater quietness, with substantially less sparking and with a consequent longer life for itself and the power line which it contacts.

The trolley wheels and shoes which are now in general use are so short lived as to require replacement after an average period of approximately two months of normal use. Numerous suggestions for improvement have been made such as the substitution of carbon shoes which slide on the line, but although the carbon shoes greatly reduce noise and sparking their useful life is even shorter because they have been found to be less resistant than metal to frictional wear.

It is recognized that rapid wear of current collectors of the type referred to is mainly due to sparking which, like noise, is caused by surface irregularities on the power line cable or on the trolley surface or on both. For example, when a wheel passes a surface irregularity on the line, both the wheel and the cable are thrown apart to an extent proportionate to the size of the irregularity and the momentum of the wheel at the time of impact, causing a spark. If the mass of the wheel were very small, the wheel would deviate more violently from its straight course while the line would hardly move, and although little noise would result still a spark would be produced. When the mass of the wheel is substantially increased, the reverse takes place, the power line being thrown violently out of position thus starting a transversal vibration which propogates itself along the length of the line and this, in turn, produces a noise which is audible within the vehicle and in the street, sometimes blocks away.

Because of practical limitations it is not possible to reduce the mass of the trolley wheel to any appreciable extent. For example, the diameter of the trolley wheel has a practical minimum which must be such as to maintain its speed of revolution within reasonable limits, in order that excessive speed shall not produce trouble in its journal bearings. The width of the wheel is also restricted to practical minimum dimensions dictated by the necessity of embracing the line cable and its suspension attachments. Finally, the thickness of metal in the wheel has a minimum dictated by the rapidity of wear and the requirements as to current conducting capacity, which is comparatively high inasmuch as the current sometimes exceeds six hundred amperes.

It follows, therefore, that even when built to minimum requirements, the wheel as a whole always has a large mass as compared to that of the line cable, especially if the mass of the supporting pin, bearings, harp and part of the trolley pole are added to it, as necessarily is the case. The total mass is too large for quiet operation and cannot be reduced to an extent sufficient to obtain quietness without impairing efficiency of the wheel.

This invention has for its object to produce quietness and reduce sparking by dividing the total mass of the trolley wheel into a multiplicity of small masses which act individually when they come in contact with the line cable, as far as the effects of inertia are concerned. In this respect, the grooved portion of the wheel, in which the line cable is received, is composed of a multiplicity of yieldingly supported segments. When the wheel is placed in contact with the line cable the reaction of the cable against the grooved portion of the wheel causes some of the segments to deflect radially toward the hub of the wheel, thus establishing contact between the line cable and at least two or sometimes three of the segments. If the wheel meets with an asperity on the line cable the wheel passes over it simply by permitting the contacting segment to move radially inwardly a distance equal to the height of the asperity, a movement which is opposed by the inertia of the segment and a spring only, and not by the inertia of the much greater mass of the wheel and its mounting. The relatively very small inertia of the individual segments is not sufficient to impart an appreciable amount of vibrating energy and the noise thus produced is negligible. Furthermore, if the segment in passing over the asperity is caused to jump clear of the line cable, the segment or segments next thereto will be in contact with the line cable and will conduct the current, and sparking is materially reduced.

Figure 2:
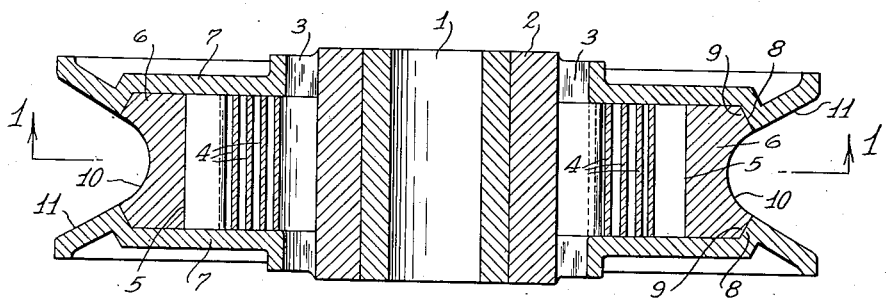

Other objects and advantages will become more fully apparent as reference is made to the accompanying drawing wherein the invention is illustrated, and in which Fig. 1 is a section taken on the line 1—1 of Fig. 2, and Fig. 2 is a section taken on the line 2—2 of Fig. 1.

More specifically, 1 designates a bearing sleeve pressed into a hub 2 in which is formed a multiplicity of radial slots 3. In each slot 3 is disposed one end of a spring blade 4, and the other end of each spring is disposed in a radial slot 5 in a segment 6. That is, there is a spring blade 4 and a groove 3 corresponding to each of the multiplicity of segments 6.

Two cheek plates 7 are pressed on the hub 2, with one at each side of the blades 4 and the segments 6. The cheek plates 7 prevent displacement of the spring blades 4 from their slots 3 and 5 in axial directions, and are provided with internal shoulders 8 near their outer peripheries which coact with shoulders 9 on the segments 6 to prevent the segments from spreading radially outwardly under the action of centrifugal forces. The peripheral portions of the segments are grooved at 10 for reception of a line cable, and the cheek plates 7 have peripheral portions 11 which constitute continuations of the side walls of the grooves 10.

The hub 2 and the segments 6 are so spaced that the spring blades 4, which have the form of overlapping spiral segments, do not contact one another when in their free position. When radial pressure is applied to any one of the segments 6, the spring blade which supports it is depressed radially until it contacts the spring blade directly beneath it. If the radial pressure is sufficient this second spring blade is also depressed until it touches a third blade and eventually the fourth blade is also depressed until it touches the hub 2.

The elasticity of the blades 4 is so proportioned that in service such an extreme condition will never occur, and so that the segments 6, under the radial pressures expected in service, never produce a solid metallic contact with the hub 2, but remain sprung on the spring blades 4 as small individual masses. The metallic cross section of each of the spring blades 4 is such that each blade is capable of independently conducting the maximum current required in service, at least for the short time any individual blade would be required to while the wheel is rotating.

In service, the trolley pole pushes the trolley wheel, which is mounted upon its end, against the line cable with a force averaging generally a value of fourteen pounds. The spring blades 4 are so constructed that under such conditions the reaction of the line cable against the wheel causes a spring deflection such as to establish contact between the cable and at least two and often three of the segments 6. Thus, it may be seen that noise is reduced because the only inertia effective to produce noise is that of the segments 6 which are of a mass amounting to but a small fraction of the total mass. Sparking is eliminated because when one segment is thrown from contact with the line cable at least one other segment and often more than one will be in contact with the line cable and will conduct the current until the deflected segment is restored to contact with the cable by its spring 4.

Although a specific embodiment of the invention has been illustrated and described, it will be understood that various changes may be made within the scope of the appended claims without departing from the spirit of the invention and such changes are contemplated.

What is claimed is:

1. A trolley wheel comprising a hub, a peripheral portion adapted to engage a current conductor, said peripheral portion being divided into a multiplicity of masses each of which constitutes but a small fraction of the total mass of the peripheral portion, and spring means yieldingly connecting each of said small masses to said hub independently and in such manner that each of said masses and its own spring acts individually as far as the effects of inertia are concerned when they contact a current conductor, said yielding means exerting a pressure such that under the expected reacting pressure resulting from contact with a current conductor sufficient deflection takes place to enable contact of more than one of the small masses with the current conductor under comparatively severe shocks.

2. A trolley wheel comprising a hub, a peripheral portion adapted to engage a current conductor, said peripheral portion being divided into a multiplicity of masses each of which constitutes but a small fraction of the total mass of the peripheral portion, and a spiral type spring individually connecting each of said small masses to said hub, each spring being capable of resisting complete deflection under the expected reaction pressure resulting from contact with a current conductor, a plurality of said springs being adapted to act in series under abnormal shocks.

3. A trolley wheel comprising a hub and a peripheral portion grooved for the reception of a line cable, said peripheral portion being composed of a multiplicity of segments, and spring means yieldingly connecting each segment individually electrically and mechanically to said hub.

4. A trolley wheel comprising a hub and a peripheral portion grooved for the reception of a line cable, said peripheral portion being composed of a multiplicity of segments, spring means yieldingly connecting each segment individually to said hub, and cheek plates rigidly mounted on said hub at opposite sides of the segments and the springs, said cheek plates and segments having coacting means restricting outward movement of the segments in the presence of centrifugal forces, said cheek plates extending substantially outwardly beyond said segments to constitute line cable confining means.

5. A trolley wheel comprising a hub having a multiplicity of radial slots, spring blades each having one end thereof disposed in one of said slots, a power line contacting portion comprising a multiplicity of independently movable segments, each segment having a radial slot receiving the other end of respective springs, said springs constituting yielding means for supporting said segments on said hub, and cheek plates rigidly mounted on said hub, said cheek plates constituting means for preventing lateral displacement of the springs and segments.

6. A trolley wheel comprising a hub having a multiplicity of radial slots, spring blades each having one end thereof disposed in one of said slots, a power line contacting portion comprising a multiplicity of independently movable segments, each segment having a radial slot receiving the other end of respective springs, said springs constituting yielding means for supporting said segments on said hub, and cheek plates rigidly mounted on said hub, said cheek plates constituting means for preventing lateral displacement of the springs and segments, and said cheek plates and segments having coacting portions restricting outward movement of said segments in the presence of centrifugal forces.

EMIL H. PIRON.